United States Patent
Grace et al.

(10) Patent No.: US 7,141,231 B2
(45) Date of Patent: Nov. 28, 2006

(54) INTERNALLY CIRCULATING FLUIDIZED BED MEMBRANE REACTOR SYSTEM

(75) Inventors: John Grace, Vancouver (CA); Choon Jim Lim, Vancouver (CA); Alaa-Eldin M. Adris, Port Moody (CA); Donglai Xie, Vancouver (CA); David Anthony Boyd, Vancouver (CA); Warren MacKay Wolfs, Vancouver (CA); Clive M. H. Brereton, Richmond (CA)

(73) Assignee: Membrane Reactor Technologies Ltd., Vancouver (CA)

( * ) Notice: Subject to any disclaimer, the term of this patent is extended or adjusted under 35 U.S.C. 154(b) by 378 days.

(21) Appl. No.: 10/637,639

(22) Filed: Aug. 11, 2003

(65) Prior Publication Data

US 2005/0036940 A1 Feb. 17, 2005

(51) Int. Cl.
*C01B 3/24* (2006.01)
(52) U.S. Cl. .................. 423/652; 48/127.9; 48/128
(58) Field of Classification Search ............... None
See application file for complete search history.

(56) References Cited

U.S. PATENT DOCUMENTS

| | | | | |
|---|---|---|---|---|
| 2,698,281 A * | 12/1954 | Leffer | .......................... | 208/147 |
| 5,326,550 A | 7/1994 | Adris et al. | | |
| 6,045,688 A * | 4/2000 | Ruottu et al. | ............... | 208/113 |
| 6,110,979 A * | 8/2000 | Nataraj et al. | .............. | 518/704 |
| 6,331,283 B1 * | 12/2001 | Roy et al. | ................... | 423/652 |
| 6,695,983 B1 * | 2/2004 | Prasad et al. | ............... | 252/373 |

* cited by examiner

*Primary Examiner*—Colleen P. Cooke
*Assistant Examiner*—Paul Wartalowicz
(74) *Attorney, Agent, or Firm*—Oyen Wiggs Green & Mutala LLP (57) ABSTRACT

This invention relates to a novel fluidized bed membrane reactor for autothermal operations. More particularly, this invention pertains to a unique fluidized bed membrane reactor which includes internal catalyst solids circulation for conveying heat between a reforming zone and an oxidation zone. A method of producing hydrogen gas from a hydrocarbon gas and steam comprising forming a fluidized bed of a suitable particulate catalyst in a reactor, wherein the catalyst is disposed in the reactor in two reaction modes, the first being an endothermic dehydrogenation reaction mode and the second being an exothermic oxidation or partial oxidation reaction mode, introducing a mixture of steam and hydrocarbon gas into the bottom of the fluidized bed to fluidize the particulate catalyst and form the fluidized bed, reacting the steam and hydrocarbon gas within the first endothermic dehydrogenation reaction mode to produce hydrogen gas, separating said hydrogen gas from other gases in the first endothermic dehydrogenation reaction mode as molecular or atomic hydrogen through a perm-selective membrane that permits the transfer of hydrogen therethrough while preventing or minimizing the transmission therethrough of the other gases in the endothermic dehydrogenation reaction mode, introducing oxidant in the second exothermic oxidation or partial oxidation reaction mode, and mixing same with other gases in the second exothermic oxidation and partial oxidation mode, and directing resultant oxidized gases to the first endothermic dehydrogenation reaction mode.

13 Claims, 4 Drawing Sheets

FIG 1

Figure 2: Cold Model Experimental Set-up

Figure 3: Cold Model Helium Tracer Results

Figure 4B: ICFBMR

Figure 4A: Well-Mixed Membrane Reactor

FIG 6

FEED GASES
H₂O  CH₄

FIG 5

INTERNALLY CIRCULATING FLUIDIZED BED MEMBRANE REACTOR SYSTEM

FIELD OF THE INVENTION

This invention relates to a novel fluidized bed membrane reactor with inert bypass gas for autothermal operations. More particularly, this invention pertains to a unique fluidized bed membrane reactor which includes internal catalyst solids circulation for conveying heat between a reducing zone and an oxidation zone.

BACKGROUND

Membrane reactors have been proposed for numerous reactions that are thermodynamically limited such as: propane dehydrogenation to propylene, cyclohexane to benzene, ethyl benzene to styrene, steam-methane reforming to hydrogen and water-gas shift reaction to hydrogen. Most of those reactions are both reversible and endothermic. The concept of shifting thermodynamic equilibrium by removing one of the products, notably hydrogen in the case of steam-methane reformation and water-gas shift reaction, has been demonstrated to drive the reaction forward beyond its conventional thermodynamic limits thereby leading to economic and performance enhancements. Various concepts have been proposed for supplying the heat that is required for endothermic reactions. One concept is the use of heat pipes. Another concept is oxidizing part of the hydrocarbon feed in-situ by introducing an oxidant.

Membrane reactors provide a means for removing a reaction product from a reaction. Many different configurations of membrane reactors have been proposed over the years. One is a fluidized bed membrane reactor as disclosed in U.S. Pat. No. 5,326,550, Adris et al., granted Jul. 5, 1994. This patent discloses hydrogen gas being generated in a fluidized bed reactor by reacting gases namely steam and a hydrocarbon gas such as methane or natural gas in a fluidized bed of particulate catalytic material. The catalytic material is fluidized by injecting the mixture of the reacting gases at the bottom of the bed. Hydrogen generated within the bed is removed by using a selectively permeable membrane that extends through the bed and through a freeboard area above the bed. Since the reaction is endothermic, heat to maintain the bed at the desired temperature is added as required. Preferably a separator separates particulate catalytic material entrained in the gases in the freeboard area and returns the particulate material separated from the gas to the bed. The subject matter of this patent, insofar as it is relevant to the subject invention, is incorporated herein by reference.

Fluidized catalyst beds have the advantages of a high degree of solids mixing resulting in minimal temperature and concentration gradients, small particle size resulting in improved catalyst effectiveness and flexibility in shape and configuration which allows the fluidized bed to accommodate substantial permeation capacities.

U.S. Pat. No. 6,331,283 B1, Roy et al., granted Dec. 18, 2001, discloses a process of producing hydrogen by autothermal steam reformation of a hydrocarbon comprising the steps of providing a reactor vessel having a fluidized catalyst bed, introducing steam and a gaseous hydrocarbon into the vessel, introducing oxygen into the vessel, maintaining the fluidized catalyst bed temperature below the spontaneous combustion temperature of the hydrocarbon and withdrawing hydrogen from the vessel using a perm-selective membrane. The apparatus for producing hydrogen comprises a reactor vessel, steam and hydrocarbon inlets, an oxygen inlet, a fluidized bed of catalyst within the reactor vessel and a perm-selective membrane for withdrawing hydrogen from the vessel. The subject matter of this patent, so far as it is relevant to the subject invention, is incorporated herein by reference.

SUMMARY OF INVENTION

The invention is directed to a method of producing hydrogen gas from a hydrocarbon gas and steam comprising a fluidized bed of a suitable particulate catalyst in a reactor, wherein the catalyst is disposed in the reactor in two reaction modes, the first being an endothermic dehydrogenation reaction mode and the second being an exothermic oxidation or partial oxidation reaction mode, introducing a mixture of steam and hydrocarbon gas into the bottom of the fluidized bed to fluidize the particulate catalyst and form the fluidized bed, reacting the steam and hydrocarbon gas within the first endothermic dehydrogenation reaction mode to produce hydrogen gas, separating said hydrogen gas from other gases in the first endothermic dehydrogenation reaction mode as molecular or atomic hydrogen through a perm-selective membrane that permits the transfer of hydrogen therethrough while minimizing the transmission therethrough of the other gases in the endothermic dehydrogenation reaction mode, introducing oxidant in the second exothermic oxidation or partial oxidation reaction mode, and mixing same with other gases in the second exothermic oxidation and partial oxidation mode, and directing resultant heated catalyst particles and some oxidized gas to the first endothermic dehydrogenation reaction mode. The energy required for the endothermic reaction can also be provided or supplemented by an external energy source.

The first endothermic dehydrogenation mode and the second exothermic oxidation or partial oxidation mode can be separated by a barrier.

Reaction gases can circulate upwards through the first endothermic dehydrogenation mode which can contain vertically disposed perm-selective membrane surfaces and downwards through the second oxidation or partial oxidation mode. Alternatively, reaction gases can circulate downwards through the first endothermic dehydrogenation mode which can contain vertically disposed perm-selective membrane surfaces and upwards through the second oxidation or partial oxidation mode.

The catalyst particles can also circulate upwards through the first endothermic dehydrogenation mode which can contain vertically disposed perm-selective membrane surfaces and downwards through the second oxidation or partial oxidation mode. Alternatively, the catalyst particles can circulate downwards through the first endothermic dehydrogenation mode which can contain vertically disposed perm-selective membrane surfaces and upwards through the second oxidation or partial oxidation mode.

The oxidant can be provided in a mixing zone above the surface of the membrane and the barrier. The oxidant can be provided in a solids downflow that can surround the first dehydrogenation reaction mode. The oxidant can be air, oxygen enriched air or pure oxygen.

A sweep gas can be used to convey the hydrogen gas from the perm-selective membrane. Particulate catalyst can be separated from the other gases before they are conveyed from the process. The particulate catalyst circulation rate can be controlled by supplementary aeration or fluidizing gas introduced through gas distributors or nozzles.

The invention is also directed to an apparatus for producing hydrogen from steam and hydrocarbon gas comprising: (a) a reaction vessel enclosing a fluidizable catalyst bed of particulate catalyst; (b) an inlet for introducing a mixture of steam and hydrocarbon gas at the base of the reaction vessel, and fluidizing the catalyst bed; (c) a perm-selective membrane located in the central area of the reaction vessel; (d) a barrier with top and bottom openings enclosing the sides of the perm-selective membrane, the mixture of steam and hydrocarbon gas passing upwardly from the open bottom through the interior of the barrier, the fluidized catalyst bed and the perm-selective membrane; (e) at least one inlet in the wall of the reaction vessel for introducing oxygen or oxygen enriched air into the fluidized catalyst bed between the barrier and the interior of the walls of the reaction vessel; (f) an outlet for conveying hydrogen from the apparatus; and (g) an outlet for conveying product gases from the apparatus.

The apparatus can include a series of spaced perm-selective membranes located in the interior of the barrier. The apparatus can include an inlet for sweep gas to be introduced into the perm-selective membranes and purging the perm-selective membranes of hydrogen, and an outlet for enabling the sweep gas and the purged hydrogen to be withdrawn from the reaction vessel.

The barrier can be a vertical open-ended cylinder or other geometrical structure which can house the perm-selective membranes, and a portion of the particulate catalyst fluidized bed, the device extending vertically with the open bottom end being located above the inlet for introducing steam and hydrocarbon gas at the base of the reaction vessel, and enabling the steam and hydrocarbon gas to flow upwardly through fluidized particulate catalyst located in the interior of the device, and the exterior sides of the cylinder and the interior walls of the reaction vessel forming an annular space for downward flow of gas through fluidized particulate catalyst located in the annular space.

The apparatus can include a freeboard zone located below the top of the reaction vessel and above the top surface of the fluidized bed, the freeboard zone containing a separator, such as a cyclone or other suitable gas-solids separation device, which separates particulate catalysts from product gas being withdrawn through the outlet (g) at the top region of the reactor vessel.

The apparatus can include a plurality of inlets (e) for introducing air, oxygen or oxygen enriched air into the annular space between the walls of the gas barrier and the interior walls of the reaction vessel. The apparatus can include additional aeration or fluidizing gas distributors for controlling solid particulate catalyst circulation rates in the apparatus. The separator can be a cyclone or a hot filter.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention utilizes a unique inventive and highly efficient method of internal catalyst solids circulation in a fluidized bed membrane reactor. The method offers desirable hydrodynamics and facilitates use of coordinated internal components to satisfy system permeation capacity requirements. This invention also introduces oxygen in the form of air for heat generation without affecting the partial pressure of the permeating hydrogen in the reaction/permeation zone, thereby eliminating the need for upstream air separation. The invention can be used for numerous thermodynamically limited reactions but has particular application to producing hydrogen by autothermal steam reformation of a hydrocarbon source such as methane or natural gas.

In broad terms, the subject invention relates to a method and apparatus for producing hydrogen gas comprising forming a fluidized bed of a suitable particulate catalyst by introducing reacting gases comprising a mixture of steam and hydrocarbon gas into the bottom of said fluidized bed to fluidize the particles and form the fluidized bed. The fluidized bed occupies a portion of the reactor vessel and forms a reducing (dehydrogenation) reaction zone, an oxidation reaction zone and a freeboard zone in the vessel above the fluidized bed. The gases are reacted within the bed to produce hydrogen gas. The hydrogen gas is separated as it is formed and removed from the fluidized bed as molecular or atomic hydrogen by means of a perm-selective membrane that extends through the bed in the direction of flow of the reaction gases. This arrangement permits transfer of hydrogen from the reaction zones while preventing the transmission of other gases present in the reaction zone. The hydrogen gas after permeation through the perm-selective membrane provides a useful source of relatively high purity hydrogen gas.

The subject invention can be used for any thermodynamically limited reaction. Specifically, when the subject invention is employed to produce hydrogen gas by a steam-hydrocarbon gas reaction such as steam and methane, the applicable main reactions are as follows:

$$CH_4 + 2H_2O \leftrightarrows CO_2 + 4H_2 \qquad (1)$$

$$CH_4 + H_2O \leftrightarrows CO + 3H_2. \qquad (2)$$

These two reactions are reversible and endothermic. Thus heat must be provided to drive the two reactions forward. These two reversible reactions are promoted if the hydrogen is removed. This is due to the shift in the chemical equilibrium provided sufficient heat is made available to maintain the two reactions.

When CO is formed, there is a water-gas shift reaction as follows:

$$CO + H_2O \leftrightarrows CO_2 + H_2 \qquad (3)$$

This reaction is slightly exothermic and reversible. The removal of hydrogen from the reaction favours this reversible reaction as well.

Heat can be supplied to the foregoing reactions by the addition of oxygen. This results in the oxidation of methane, as represented by the following irreversible reaction:

$$CH_4 + 2O_2 \rightarrow 2H_2O + CO_2 + heat \qquad (4)$$

The above reaction is only one of several possible oxidation reactions. The oxidation of methane according to (4) is a rapid reaction and is highly exothermic. The main resulting products are carbon dioxide and water. However, carbon monoxide and hydrogen may also be produced, the amounts of which depend on the amount of oxygen and the reforming/water gas shift equilibria.

In the subject invention, the heat energy generated by this reaction is used to provide the heat to drive the endothermic reforming reactions (1) and (2) above. The net effect of oxygen addition is to increase the methane conversion, but with a decreased hydrogen yield.

Figure 1:
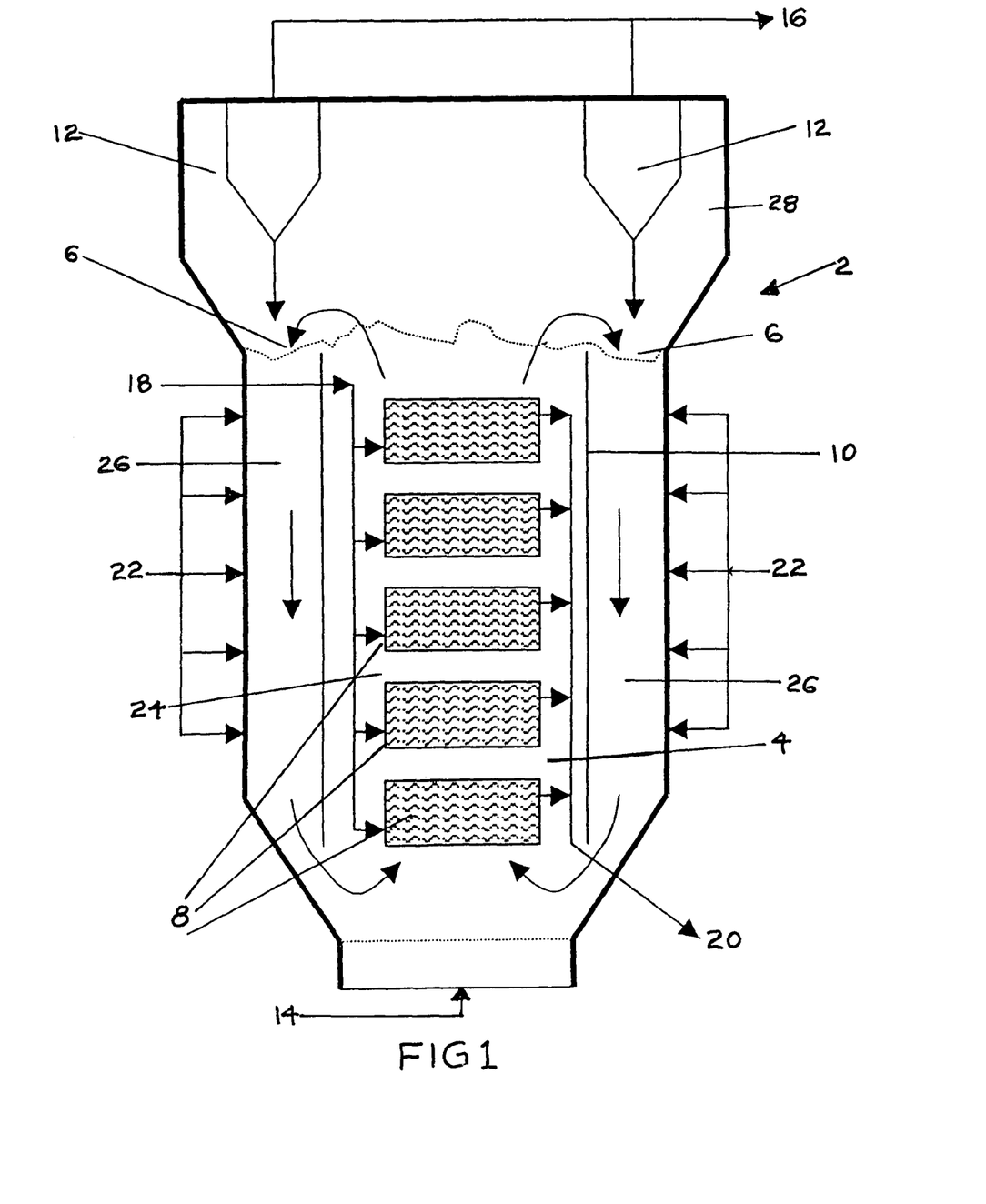
FIG. 1 illustrates a schematic sectional view of a reactor vessel according to the invention.

The subject invention will now be described with reference to the drawings. FIG. 1 illustrates a schematic section view of the reactor vessel according to the invention. As seen in FIG. 1, the reactor vessel 2 is hollow and in the embodiment depicted in FIG. 1, has a general upright urn shape, which has a relatively narrow diameter at the bottom, an intermediate diameter in the mid-region, and a broad diameter at the top. This configuration enhances fluidization quality and solids circulation of the catalyst bed and provides a broad freeboard zone above the top surface of the catalyst bed. It should be understood that other shapes of reactor vessel are possible. For instance, the freeboard zone need not be expanded. Nor does the bottom have to be of narrow diameter. The fluidized catalyst bed 4 is held in the mid-region of the reactor vessel 2. The top of the fluidized bed surface 6 is located approximately at the point where the intermediate diameter of the mid-region of the reactor vessel 2 expands to the broad diameter of the freeboard zone 28 above the top surface of the fluidized bed 6.

Disposed in the central area of the mid-region of the reactor vessel 2 in stacked relationship is a series of perm-selective membrane modules 8. In particular, five spatially stacked perm-selective membrane modules 8 are depicted in FIG. 1. They are stacked in the upward direction of flow of the reaction gases which are introduced into the reactor vessel 2 via feed line 14. The stacked membrane modules 8 are spatially housed within an internal hollow cylinder 10 which is of a diameter less than the diameter of the mid-region of the reactor vessel 2 and which is axially aligned with the vertical axis of the reactor vessel 2. The catalyst particles of the fluidized bed are disposed in both the interior of the internal hollow cylinder 10 and the annular space between the outer surface of the internal hollow cylinder 10 and the internal surface of the mid-region of the reactor vessel 2.

Cyclones 12 are located in the upper free board zone 28 of the reactor vessel 2 and serve to remove catalyst particulates from the product gas and return the particulates to the fluidized bed. As seen in FIG. 1, two cyclones are shown, although more cyclones or other gas-solids separation devices can be used if required.

To operate the reactor vessel 2, a hydrocarbon feed and steam are introduced into the base of the reactor vessel 2 as depicted by hydrocarbon feed line 14. Oxidants, such as air, enriched air or oxygen, are introduced at numerous ports constructed in the walls of the mid-region of the reactor vessel 2, as depicted by multiple arrows 22. As explained previously, the oxidant reacts with the hydrocarbon feed and provides the heat energy required to drive the endothermic reformation reaction which generates hydrogen. Product gas 16 is withdrawn from the pair of cyclones 12 which are located in the free board zone 28 at the top region of the reactor vessel 2. The cyclones 12 remove catalyst particles which can be conveyed by the product gas 16 passing through the free board zone 28 at the top of the reactor vessel 2 and are returned to the fluidized bed 4.

The perm-selective membrane modules 8 separate hydrogen as it is generated by the steam-hydrocarbon reactions and removes the hydrogen from the reactor vessel 2, thereby providing greater efficiencies. A sweep gas 18, which can be nitrogen, steam, or some other suitable gas, may be passed through the perm-selective membrane modules 8, as indicated by the arrow 18, and exits the opposite sides of the perm-selective membrane modules 8 as indicated by arrow 20. The permeate exit gas comprises sweep gas and hydrogen.

The construction of the reactor vessel 2 is unique in that the combination of the spatially stacked series of perm-selective membrane modules 8, the intermediate internal hollow cylinder 10, and the inner wall of the reactor vessel 2 divides the mid-region of the reactor vessel 2 into a dehydrogenation zone 24 which is located in the fluidized bed inside the internal hollow cylinder 10, and an oxidation zone 26, which is located in the fluidized bed in the region between the annular space between the outer wall of the internal hollow cylinder 10 and the inner wall of the mid-region of the reactor vessel 2. The separation of the dehydrogenation zone and the oxidation zone provides improved reaction efficiencies. As indicated by the arrows, the flow of hydrocarbon feed 14 at the base of the reactor vessel 2 proceeds upwardly through the fluidized catalyst bed in the interior of hollow cylinder 10, and passes the vertically and spatially stacked series of perm-selective membrane modules 8. The fluidized catalyst bed 4, in the interior of cylinder 10, in combination with the hydrocarbon feed introduced at point 14, promotes reactions 1, 2 and 3, as discussed previously in order to generate carbon dioxide, carbon monoxide and hydrogen. The generated hydrogen is withdrawn from the dehydrogenation reactions by the perm-selective membrane modules 8 and is then withdrawn from the reactor vessel 2 by passing sweep gas through the membrane modules 8 as indicated by arrow 18. The hydrogen gas exits along with the sweep gas as indicated by arrow 20. Meanwhile, a good part of the hydrocarbon feed gas 14, as represented by the flow arrows, passes over the top of cylinder 10 and circulates downwardly through the fluidized catalyst bed, that is located in the annular space between the internal hollow cylinder 10 and the mid-region of the reactor vessel 2. The oxidant, which is introduced through the plurality of ports, as represented by arrows 22, reacts with the downwardly travelling circulating product gas which contains some hydrocarbon feed, and is then returned under the base of cylinder 10 to form the hydrocarbon feed gas 14 passing upwardly through the stack of membrane modules 8. In this way, the oxidant reacting with the hydrocarbon gas generates sufficient heat to drive the endothermic reactions 1 and 2 which cause the methane and water (steam) to react to produce carbon dioxide, carbon monoxide and hydrogen.

As illustrated schematically in FIG. 1, the solids/catalyst fluidized bed, in combination with the internal hollow cylinder 10 and the inner mid-region wall of the reactor vessel 2 and the active fluidized bed surface 6, divides the reactor vessel into three distinctive, yet overlapping zones, namely a dehydrogenation zone 24, an oxidation zone 26 and a solids mixing zone at the top of cylinder 10, as well as freeboard zone 28.

The dehydrogenation zone 24 provides upwards solids and gas flow; the freeboard zone 28 and the bed surface 6 provide a solids and gas mixing zone, while oxidation zone 26 provides a solids and gas down-flow zone. In the solids up-flow zone 24, the main dehydrogenation or reforming reactions (1) and (2) take place. The down-flow zone 26 (and, optionally, the solids and gas mixing zones 6 and 28) is used for introducing the oxidant 22 (air, enriched air or oxygen) and to carry out the oxidation reaction (reaction (4)) in order to provide the energy requirements of the endothermic reactions (1) and (2). The catalyst particulate solids are heated by the oxidation reaction, which primarily takes place in the solids down-flow zone 26, or to a lesser extent, in the mixing zones 6 and 28 or in a combination of the two. It will be understood that additional ports can be used to introduce oxidant into the mixing zones 6 and 28. Circulating solids (i.e. catalyst particles, possibly augmented by inerts or sorbant particles) act as energy or heat carriers from the exothermic, oxidation regions (zones 26 and 28) to the endothermic, dehydrogenation or reforming zone (zone 24).

Particulate catalyst solids and gases are circulated in the reactor vessel 2 at a rate that is sufficient to provide the energy input requirements in the central upward dehydrogenation region (zone 24) where endothermic reactions (1) and (2) are taking place. While not shown, a mechanism or mechanisms can be included to controlling the solids circulation rate. For example, supplementary aeration or fluidizing gas can be introduced through additional gas distributors. The air or oxygen that is introduced through distribution nozzles or other means, as indicated by arrows 22 in the walls of the reactor vessel 2, must be under conditions which provide sufficient contact time to effect consumption of the oxygen by oxidizing either carbon deposited on the catalyst surface and/or hydrocarbon feedstock, fed separately. The inert nitrogen in the air flows predominantly upwards in zone 24, together with other product gases leaving the fluidized catalyst bed, to exit the reactor vessel 2 through cyclones 12 at the top region of the reactor vessel 2. Two main unprecedented advantages are achieved by the introduction of air (oxidant) in zones 26 and 28, namely (1) nitrogen in large part bypasses the perm-selective membrane modules 8 which leads to minimizing the adverse effect that nitrogen has on hydrogen partial pressure reduction near the perm-selective membrane surface; and (2) oxidant introduction and depletion in zones 26 and 28 ensures that the surfaces of the perm-selective membrane modules 8 will not be exposed to an oxidizing environment that may have an adverse impact on their performance and longevity.

Separating the main upward dehydrogenation reaction (zone 24) from the downward oxidation reaction (zone 26) also has several benefits in membrane longevity and mechanical robustness, such as eliminating potential hot spots from oxidation or free oxidant near the membranes. In addition, if air or enriched air is used as the oxidant, the internally circulating fluidized bed membrane reactor concept according to the invention can also increase membrane utilization as most of the inert nitrogen in the oxidant flows directly from the oxidation zone 26 out of the reactor through line 16. Only a small portion of the nitrogen is circulated to the reaction zone 24, thus reducing the hydrogen partial pressure near the membranes 6 only marginally. Adding air to a well mixed or plug flow reaction system would result in significant reduction in the hydrogen partial pressure, thus reducing the hydrogen membrane flux.

The perm-selective membrane modules 8 may be constructed of any suitable material that will, as above described, result in the partially or perfectly selective transmission of the particular reaction product material, in this case hydrogen from the reactants, while tending to prevent the transmission of any of the other gases or chemicals present such as the reaction mixture gases that are present within the reactor vessel 2. The perm-selective membrane modules, in the subject invention, when dealing with hydrogen generation, may be substantially perfectly selective to hydrogen (e.g. they may be tubes of dense phase membranes, Ni, Nb, Pd, or alloy metal coatings on porous structures enveloped by shielding). The membranes have the mechanism of transfer, adsorption, molecule disassociation, atomic diffusion, atoms combination and then molecular desorption. Alternatively, the membranes that may be partially selective to hydrogen, for example alumina base or silica base porous membranes which operate on the principle of Knudson diffusion or molecular sieving wherein selectivity depends on the pore size and relative molecular sizes of the different gases involved in the gas mixture. In other words, the membrane transfers the smaller molecular size gas therethrough while preventing the transmission of the larger molecules.

The choice of which perm-selective membrane to use in any particular application will depend on the application including the downstream process requirements and the conditions within the reactor. Since as much hydrogen as possible should be stripped from the product gases before the product gases are exhausted from the system via line 16, the membrane tubes should be as long as is practicable.

The fluidizable catalyst bed utilized in the subject invention is comprised of a plurality of catalyst particles which are fluidized by the upward movement of the reacting gases which are introduced into the bottom of the reactor vessel (2). The catalyst particles act as an internal heat carrier in the fluidized bed which thereby provides uniform reactor temperature throughout the bed. Suitable particulate catalysts are well-known in the art and include nickel, platinum and rhodium. The particular catalyst used will depend on the specific reactions and conditions intended. For example, a nickel catalyst supported over an a-alumina substrate (nickel loading of 4% to 22%) has been found satisfactory for the reactions and conditions disclosed herein. The catalyst particles should have a particle size range of about 10 to 355 microns (preferably 20 to 300 microns) with mean diameters in the range of about 50 to 200 microns (preferably 60 to 150 microns) in order to be conveniently fluidizable. The reforming reaction and formation of the fluidized bed by natural gas, steam mixture should preferably be maintained at a temperature of 650° to 950° C. under a pressure of 1.5 to 4.5 Mpa.

EXAMPLES

Set out below are calculations and examples that support and quantify how the internally circulating fluidized bed membrane reactor according to the invention greatly reduces circulation of inert gas (i.e. nitrogen) to the membrane-containing reaction zone.

1. Cold Model Experiments

To simulate and visualise the solids circulation and gas flow patterns of the internally circulating fluidized bed membrane reactor, a 2.6 m high, 0.23 m ID Plexiglas model was constructed. A 0.13 m×0.13 m, high core box containing 6 equally spaced vertical panels was installed to simulate hydrogen membranes. The expanded bed height was approximately 0.3 m above the top of the core box.

The model operated on air at ambient pressure and temperature. Fluid catalytic cracking (FCC) catalyst with a mean particle diameter of $70 \times 10^{-6}$ m was used as the fluidization powder.

The main fluidization air was injected into the column through a bottom distributor and flowed up through the main core box. Superficial gas velocities in the core box were on the order of 0.3 to 0.6 m/s. As expected, vigorous fluidization was seen as the gas bubbles erupted from the bed surface. Positive and consistent solids circulation was verified by observing the down-flow of catalyst in the four annular regimes at a velocity of 0.02 to 0.04 m/s.

Figure 2:
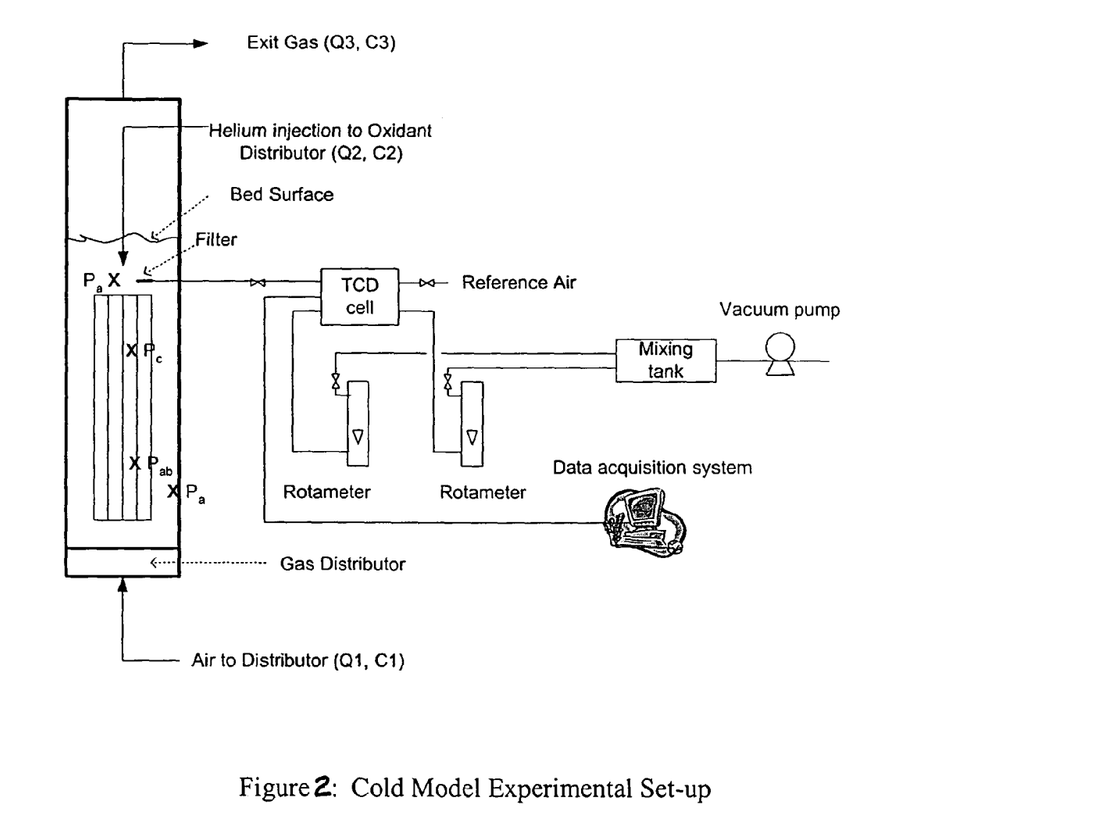
FIG. 2 illustrates a schematic diagram of a cold model experimental set-up.

To simulate addition of oxidant, helium was injected into the bed through a top distributor located immediately above the core membrane box. Gas samples were taken from four different points in the fluidized bed and analyzed for helium. FIG. 2 illustrates a schematic diagram of the set-up of the cold model. The data was obtained from the sample points shown in Table 1.

TABLE 1

Cold Model Sample Points

| Point | Location | Zone Description |
|---|---|---|
| Pa | Lower annulus | Solids down flow return |
| Pb | Lower core | Membrane area, solids upflow |
| Pc | Upper core | Membrane area, solids upflow |
| Pd | Mixing Zone | Well-mixed area near bed surface |

The air supply to the bottom distributor ($Q_1$) was varied from 8 to 22 Nm³/h. The flow to the top oxidant distributor ($Q_2$) was fixed at 0.57 Nm³/h and contained 100% helium ($C_2$). The exit gas concentration is designated as $C_3$. The exit helium concentration in a perfectly mixed system is predicted by the equation:

$$C_3 = C_2 \cdot Q_2 / (Q_1 + Q_2)$$

Figure 3:
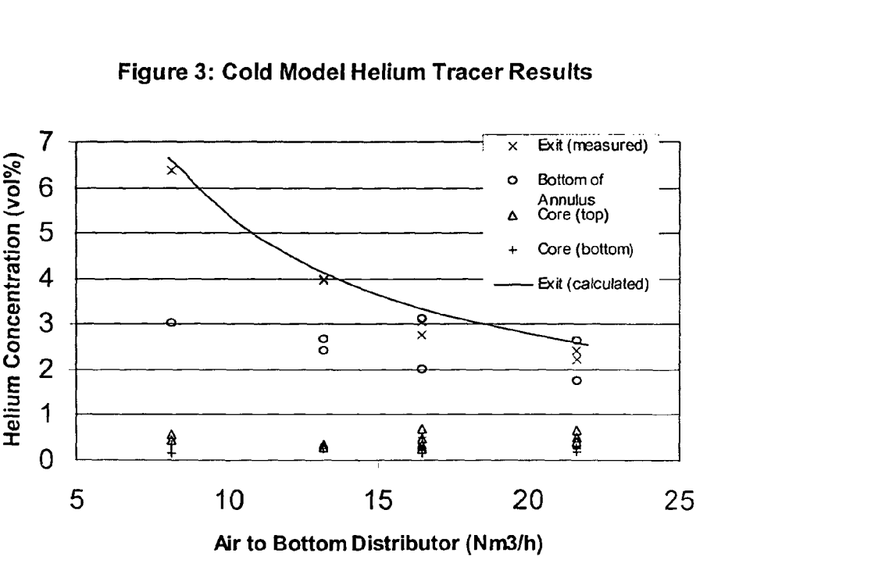
FIG. 3 is a graph of cold model helium tracer results.

Table 2 below tabulates data obtained from the helium tracer experiments at points $P_a$, $P_b$, $P_c$ and $P_d$. FIG. 3 is a graph of cold model helium tracer results.

TABLE 2

Data from Helium Tracer Experiments

Measured Helium Concentration (%)

| Run | Distributor Air - $Q_1$ (Nm³/h) | Lower Annulus ($P_a$) | Lower Core ($P_b$) | Upper Core ($P_c$) | Splash Zone ($P_d$) | Predicted Exit Helium $C_2$ (%) |
|---|---|---|---|---|---|---|
| 1 | 8.1 | 3.02 | 0.57 | 0.34 | 6.37 | 6.59 |
| 2 | 8.1 |  | 0.45 | 0.17 |  |  |
| 3 | 13.2 | 2.66 | 0.3 | 0.26 | 3.96 | 4.13 |
| 4 | 13.2 | 2.4 | 0.36 | 0.27 | 3.98 |  |
| 5 | 16.5 | 3.12 | 0.68 | 0.51 | 3.05 | 3.33 |
| 6 | 16.5 | 1.98 | 0.26 | 0.21 | 2.74 |  |
| 7 | 16.5 |  | 0.35 | 0.17 |  |  |
| 8 | 16.5 |  | 0.47 | 0.15 |  |  |
| 9 | 21.6 | 2.64 | 0.67 | 0.26 | 2.41 | 2.58 |
| 10 | 21.6 | 1.74 | 0.51 | 0.29 | 2.23 |  |
| 11 | 21.6 |  | 0.4 | 0.19 |  |  |

As can be seen in Table 2 and FIG. 3, the helium concentration in the core is approximately 0.5%, a factor of 5 to 12 times lower than the theoretical well-mixed helium concentration. This demonstrates that only 8 to 20% of nitrogen injected into the oxidation zone is circulated to the membrane region dehydrogenation (zone 1) with the internally circulating fluidized bed membrane reactor concept. The calculated helium concentration ($C_3$) closely matches the measured helium value for the splash zone.

2. Examples Demonstrating Increase in Membrane Efficiency

The membrane performance of a conventional well-mixed membrane reactor and an internally circulating fluidized bed membrane reactor according to the invention applied to the steam-methane reforming reaction was simulated using a commercial process simulator (HYSIS). The following design basis was applied:

650° C. average operating temperature;

25 bara operating pressure;

Reactor feed of 1 and 3.1 kmol/h of methane and steam respectively with a preheat temperature of 650° C.;

Air used to supply the endothermic heat of reaction, preheated to 650° C.;

3.48 m² of hydrogen perm-selective membrane surfaces installed with a specific permeation rate of 1.5 kmol/m² h bar$^{0.5}$;

Hydrogen flux through membrane proportional to the difference in the square root of the trans-membrane partial pressures (Sievert's Law);

2 bara permeate hydrogen pressure;

assume that gas leaving the membrane area is at thermodynamic equilibrium;

hydrogen partial pressure of gas leaving the membrane section used for permeation calculation;

10% of the nitrogen in the oxidant is recycled to the membranes of the internally circulating fluidized membrane reactor.

Figure 4A:
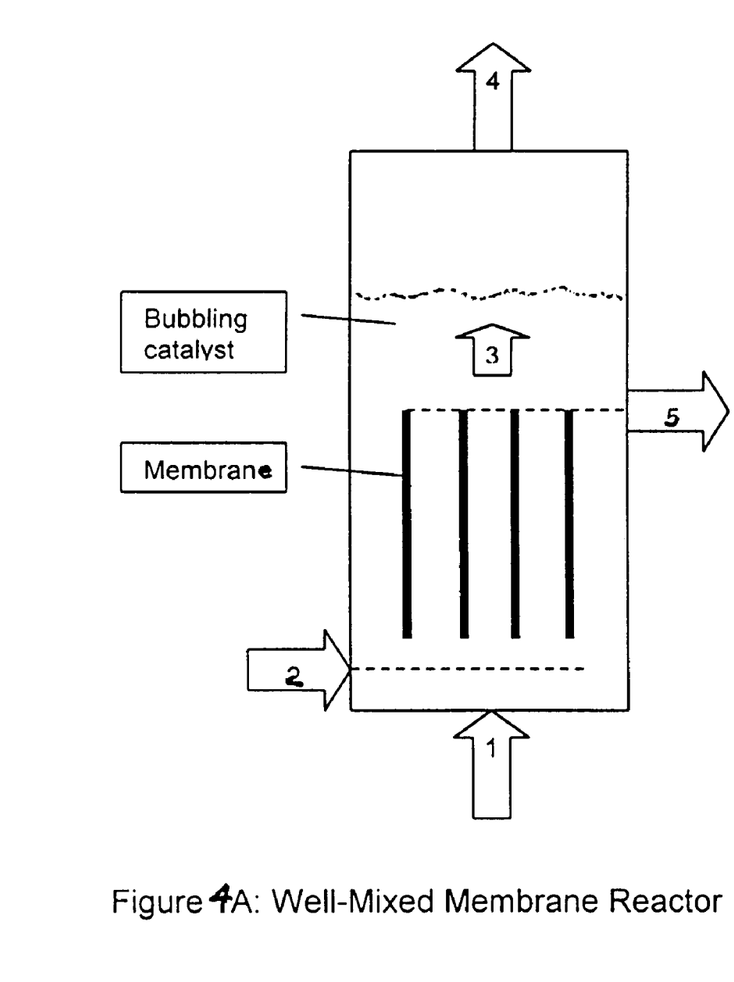
FIG. 4A is a schematic section view of a well-mixed membrane reactor according to the prior art.
Figure 4B:
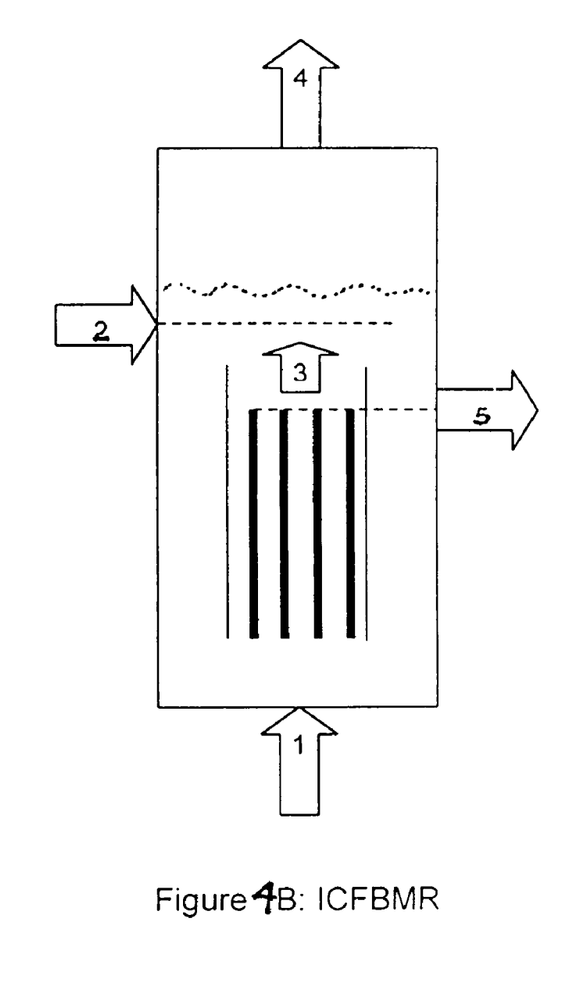
FIG. 4B is a schematic view of an internally circulating fluidized bed membrane reactor according to the invention.

FIGS. 4A and 4B show simple process schematics for the two reactor concepts, namely the well-mixed membrane reactor and the internally circulating fluidized bed membrane reactor according to the invention. Arrow 1 in each case represents injection of hydrocarbon feed. Arrow 2 in each case represents injection of oxidant. Arrow 3 in each case represents product gas after passing through the perm-selective membranes. Arrow 4 in each case represents product gas exit. Arrow 5 in each case represents extracted hydrogen. Table 3 below indicates the calculated process flows. The concentration of nitrogen and carbon dioxide in product gas 4 is higher in the internally circulating fluidized bed membrane reactor.

TABLE 3

Stream Data for FIGS. 4A and 4B

Well - Mixed Membrane Reactor

| Stream | 1 | 2 | 3 | 4 | 5 |
|---|---|---|---|---|---|
| Flow (kmol/h) | 4.1 | 1.60 | 5.09 | 5.09 | 2.00 |
| $CH_4$ | 0.244 | | 0.027 | 0.027 | |
| CO | | | 0.023 | 0.023 | |
| $CO_2$ | | | 0.146 | 0.146 | |
| $H_2O$ | 0.756 | | 0.426 | 0.426 | |
| $N_2$ | | 0.79 | 0.248 | 0.248 | |
| $O_2$ | | 0.21 | 0.000 | 0.000 | |
| $H_2$ | | | 0.129 | 0.129 | 1 |
| Temperature (° C.) | 650 | 650 | 650 | 650 | 651 |
| Pressure (kPa) | 2500 | 2500 | 2500 | 2500 | 200 |
| Heat flow (kJ/h) | −718858 | 30,757 | −724,848 | −724,848 | 36,748 |
| $H_2$ partial pressure (kPa) | 0 | 0 | 323 | 323 | 200 |

Internally Circulating Fluidized Bed Membrane Reactor

| Stream | 1 | 2 | 3 | 4 | 5 |
|---|---|---|---|---|---|
| Flow (kmol/h) | 4.10 | 1.80 | 3.19 | 4.92 | 2.7 |
| $CH_4$ | 0.244 | | 0.056 | 0.004 | |
| CO | | | 0.035 | 0.018 | |
| $CO_2$ | | | 0.223 | 0.181 | |
| $H_2O$ | 0.756 | | 0.492 | 0.404 | |
| $N_2$ | | 0.79 | 0.045 | 0.318 | |
| $O_2$ | | 0.21 | 0 | 0.000 | |
| $H_2$ | | | 0.149 | 0.075 | 1 |
| Temperature (° C.) | 650 | 650 | 650 | 650 | 651 |
| Pressure (kPa) | 2500 | 2500 | 2500 | 2500 | 200 |
| Heat flow (kJ/h) | −718,858 | 34,596 | −607,581 | −731,169 | 49,609 |
| $H_2$ partial pressure (kPa) | 0 | 0 | 374 | 189 | 200 |

Figure 5:
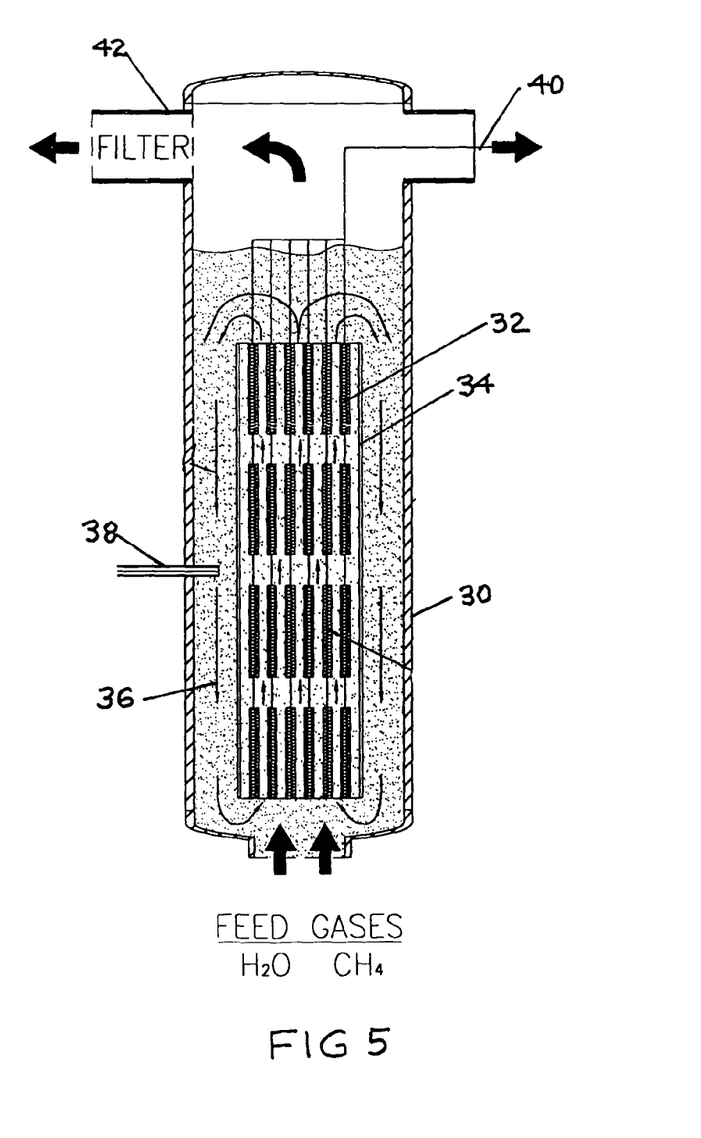
FIG. 5 illustrates a schematic of a second embodiment of internally circulating fluidized bed membrane reactor.
Figure 6:
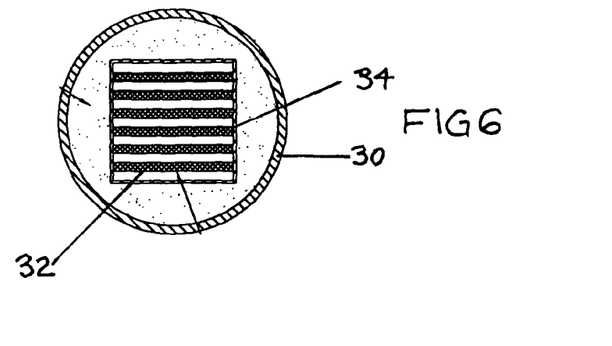
FIG. 6 illustrates a section view taken horizontally through the mid-region of FIG. 5.

FIG. 5 illustrates a schematic of a second embodiment of internally circulating fluidized bed membrane reactor according to the invention. FIG. 6 illustrates a section view taken horizontally through the mid-region of FIG. 5.

It will be apparent that the general overall concept for the reactor 30 illustrated in FIGS. 5 and 6 is the same as discussed previously in relation to the reactor vessel 2 illustrated in FIG. 1. The interior of the reactor 30 illustrated in FIGS. 5 and 6 generates internally circulating gas flow as indicated by the thin arrows. The feed gases, steam and methane are introduced into the base of the reactor 30 as indicated by the bottom large arrows and flow upwardly through the interior spaces of the stacked membrane sections 32 which are enclosed in box casing 34. The fluidized catalyst bed 36 is disposed both inside the membrane box casing 34 and the annular space 36 between the casing 34 and the reactor shell 30. The gases traveling downwardly through the annular space 36 are oxidized by the introduction of air and/or oxygen through inlet 38. The resultant relatively pure hydrogen product is withdrawn through line 40. Off gases such as water, carbon dioxide, carbon monoxide and small amounts of hydrogen and methane are withdrawn through exit port 42. This stream may be used for various purposes, including preheating the feed gases by heat exchange with or without being combusted.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of producing hydrogen gas from a hydrocarbon gas and steam comprising:
   (a) forming a fluidized bed of a suitable particulate catalyst in a reactor;
   (b) deploying part of the catalyst in the reactor in a first endothermic dehydrogenation reaction mode; and
   (c) deploying part of the catalyst in the reactor in a second exothermic oxidation or partial oxidation reaction mode, said second exothermic dehydrogenation reaction mode being physically separated from the first endothermic dehydrogenation reaction mode but enabling the circulation of particles and gases between the first and second modes;
   (d) introducing a mixture of steam and hydrocarbon gas into the bottom of the fluidized bed to fluidize the particulate catalyst and form the fluidized bed, reacting the steam and hydrocarbon gas within the first endothermic dehydrogenation reaction mode to produce hydrogen gas;
   (e) separating said hydrogen gas from other gases in the first endothermic dehydrogenation reaction mode as molecular or atomic hydrogen through a perm-selective membrane that is located in the first endothermic dehydrogenation reaction mode, said perm-selective membrane permitting the transfer of hydrogen therethrough while minimizing the transmission therethrough of the other gases in the endothermic dehydrogenation reaction mode;
   (f) introducing oxidant into the second exothermic oxidation or partial oxidation reaction mode, and mixing the oxidant with other gases in the second exothermic oxidation and partial oxidation mode; and (g) directing resultant heated particulate catalyst to the first endothermic dehydrogenation reaction mode.

2. A method as defined in claim 1 wherein the first endothermic dehydrogenation mode and the second exothermic oxidation or partial oxidation mode are separated by a barrier.

3. A method as claimed in claim 2 wherein gases circulate upwards though the first endothermic dehydrogenation mode which contains vertically disposed perm-selective membrane surfaces and downwards through the second oxidation or partial oxidation mode.

4. A method as claimed in claim 2 wherein gases circulate downwards through the first endothermic dehydrogenation made which contains vertically disposed perm-selective membrane surfaces and upwards through the second oxidation or partial oxidation mode.

5. A method as claimed in claim 3 wherein the particulate catalyst circulates upwards through the first endothermic dehydrogenation mode which contains vertically disposed perm-selective membrane surfaces and downwards through the second oxidation or partial oxidation mode.

6. A method as claimed in claim 3 wherein the particulate catalyst circulates downwards though the first endothermic dehydrogenation mode which contains vertically disposed perm-selective membrane surfaces and upwards through the second oxidation or partial oxidation mode.

7. A method as claimed in claim 2 wherein the oxidant is provided in a mixing zone above the surface of the membrane and the barrier.

8. A method as claimed in claim 2 wherein the oxidant is provided in a solids downflow that surrounds the first dehydrogenation reaction mode.

9. A method as claimed in claim 1 wherein the oxidant is air, oxygen enriched air or pure oxygen.

10. A method as claimed in claim 1 wherein a sweep gas is used to convey the hydrogen gas from the perm-selective membrane surfaces after permeating though the membrane.

11. A method as claimed in claim 1 wherein particulate catalyst is separated from the non-permeable gases before they are conveyed from the process.

12. A method as claimed in claim 1 wherein the particulate catalyst circulation rate is controlled by supplementary aeration or fluidizing gas introduced through gas distributors or nozzles.

13. A method of producing hydrogen gas from a hydrocarbon gas and steam comprising:

(a) forming a fluidized bed of a suitable particulate catalyst in a reactor;

(b) deploying a first pan of the particulate catalyst in one volume of the reactor in a first endothermic dehydrogenation reaction mode; and (c) deploying a second part of the particulate catalyst in a second volume of the reactor in a second exothermic oxidation or partial oxidation reaction mode, said second exothermic oxidation or partial oxidation mode being physically separated from the first endothermic dehydrogenation reaction mode but enabling the circulation of particulate catalyst and gases between the first and second modes;

(d) introducing a mixture of steam and hydrocarbon gas into the bottom of the fluidized bed to fluidize the first and second parts of the particulate catalyst and form the fluidized bed, and reacting the steam and hydrocarbon gas within the first endothermic dehydrogenation reaction mode to produce hydrogen gas;

(e) separating said hydrogen gas from other gases in the first endothermic dehydrogenation reaction mode as molecular or atomic hydrogen through a plurality of vertically disposed perm-selective membranes that are located in the first endothermic dehydrogenation reaction mode, said perm-selective membranes permitting the transfer of molecular or atomic hydrogen therethrough while minimizing the transmission therethrough of the other gases in the endothermic dehydrogenation reaction mode;

(f) introducing air into the second exothermic oxidation or partial oxidation reaction mode, and mixing the air with other gases in the second exothermic oxidation and partial oxidation mode; and (g) directing resultant particulate catalyst to the first endothermic dehydrogenation reaction mode wherein the particulate catalyst is circulated upwards through the first endothermic dehydrogenation mode and downwards through the second oxidation or partial oxidation mode.

* * * * *